Figure 1:
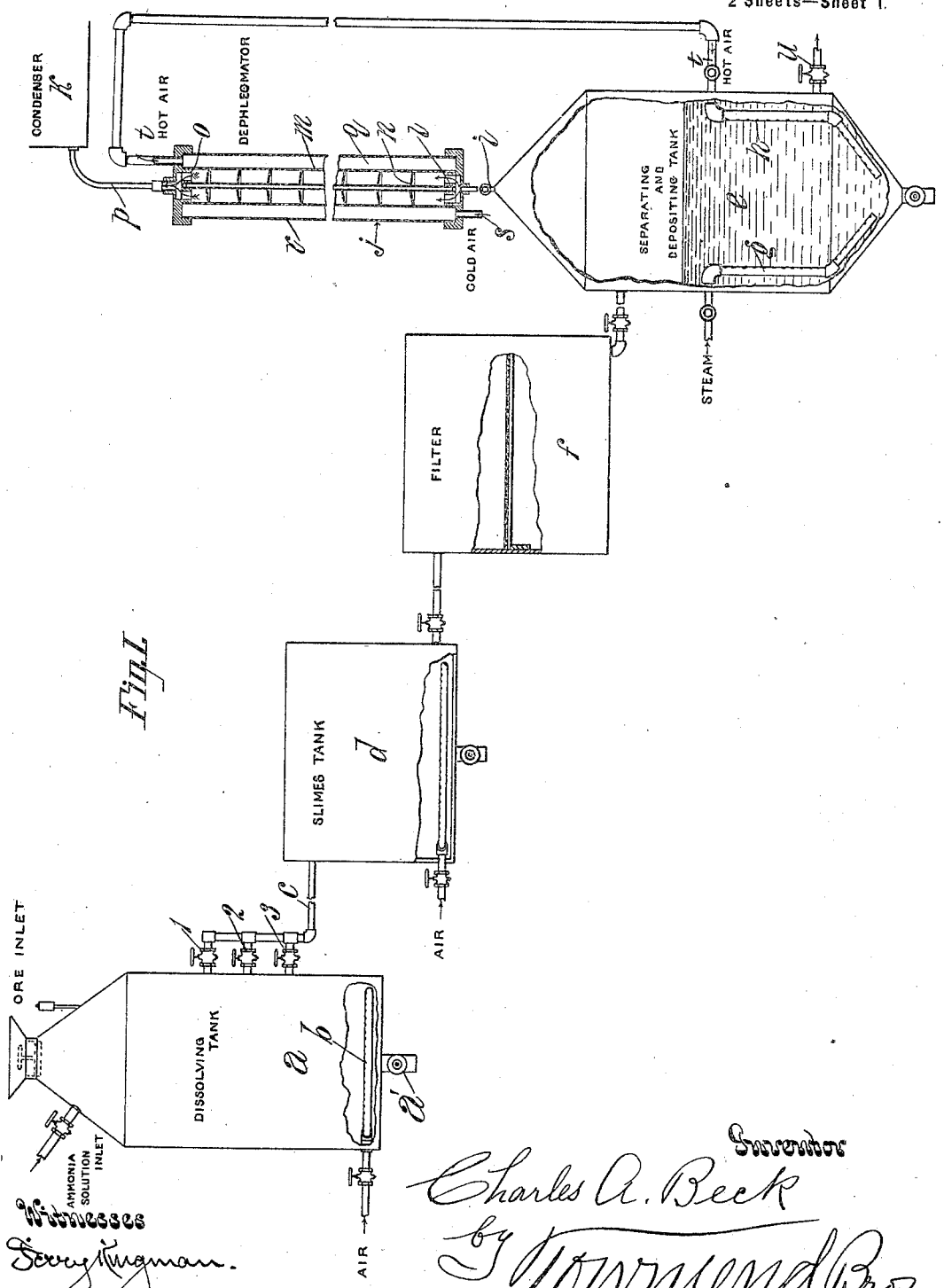

No. 682,232. Patented Sept. 10, 1901.
C. A. BECK.
PROCESS OF PRODUCING METALLIC OXIDS FROM COPPER ORES BY AMMONIUM SOLUTIONS.
(Application filed May 21, 1900.)
(No Model.) 2 Sheets—Sheet 1.

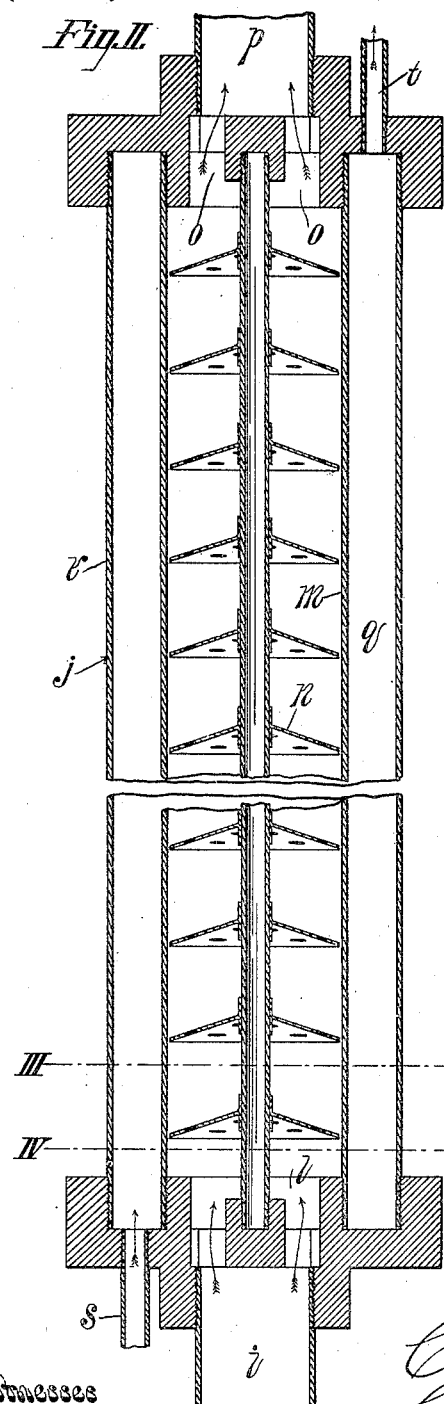

UNITED STATES PATENT OFFICE.

CHARLES A. BECK, OF GOODSPRINGS, NEVADA.

PROCESS OF PRODUCING METALLIC OXIDS FROM COPPER ORES BY AMMONIUM SOLUTIONS.

SPECIFICATION forming part of Letters Patent No. 682,232, dated September 10, 1901.

Application filed May 21, 1900. Serial No. 17,476. (No specimens.)

*To all whom it may concern:*

Be it known that I, CHARLES A. BECK, a citizen of the United States, residing at Goodsprings, in the county of Lincoln and State of Nevada, have invented certain new and useful Improvements in Processes of Producing Metallic Oxids from Copper Ores by Ammonium Solutions, of which the following is a specification.

My invention relates to a process which has for its object principally the full recovery of the ammonia and the production of the copper oxids from the cupro-ammonia solution.

I have found in the actual treatment of copper ores at Goodsprings, Nevada, with ammonium solutions that the former method of decomposition of the copper-ammonium solution is so wasteful and expensive that it is commercially unprofitable.

I find by the use of steam alone or by the direct application of hot air alone the cupro-ammonium solution does not entirely nor readily decompose, and the precipitated copper oxid adheres to the iron or steel boiler used. After several months trial by the old method it was found that the two thousand two hundred and sixty-five to two thousand five hundred and forty-eight liters solution (cupro-ammonium) in the decomposition-tank had been increased by the steam used for boiling out and decomposing said solution from four thousand nine hundred and fifty-five to five thousand five hundred and twenty-one liters, according to the strength of the cupro-ammonium solution. Hot air alone would not economically decompose the cupro-ammonium solution on account of the enormous volume that would be required.

The object of my invention is to increase the economy of the ammonia process of treating ores and to provide for the treatment of large quantities of ore with comparatively inexpensive apparatus.

My invention, relating to the production of metallic oxids from copper ores by ammonia solutions, consists in decomposing the cupro-ammonium solution by subjecting the same to the simultaneous action of steam and hot air, collecting and condensing the ammonia, and precipitating the metallic oxid in the decomposition-tank. I also condense the steam to separate the ammonia therefrom on its way from the decomposition-tank to the condenser, where the ammonia is recovered. By the use of steam and hot air together I find that the decomposition of the cupro-ammonium solution can be made commercially profitable with a plant which I have in operation at Goodsprings, Nevada. Analysis of the partially-decomposed cupro-ammonium solution under the old method of steam alone shows that 0.38 to 0.68 milligrams of metallic copper per liter and from 0.12 per cent. to 0.28 per cent. of ammonia were left in the solution. This would mean that in every charge of two thousand two hundred and sixty-five to two thousand five hundred and forty-eight liters of the cupro-ammonium solution, which through the addition of the condensed steam had been increased in volume to from four thousand nine hundred and fifty-five to five thousand five hundred and twenty-one liters, there would be from 1.883 to 3.369 kilograms of copper and from 0.12 per cent. to 0.28 per cent. ammonia, which would practically be lost, and therefore make the process unprofitable. By the use of air without steam I find that the volume necessary would be so great that the condensing-tanks of the ammonia would have to be of such size and strength as to be unprofitable for commercial use. By first using steam and then forcing in hot air simultaneously with the steam I find that the latter assists in the decomposition of the cupro-ammonium solution, that the solution is entirely decomposed in less time, and that the copper and the ammonia are all recovered. Calculating the least proportion of loss under the old methods which is saved by my newly-discovered method, I find the following to be the saving which I make in the treatment of one ton of ore: With copper at fifteen and one-half cents per pound, 1.882 kilos, to be sixty-five cents; anhydrous ammonia, 2.1 pounds at sixty-two and one-half cents per pound, one dollar and thirty-one cents. Add to this one hour time saved by my process in the decomposition of the solution representing the fuel and labor a value of one dollar, thus making a total average saving on every charge of one ton of two dollars and ninety-six cents. In a small plant like the one which I have operated at Goodsprings, Nevada, treating daily only ten tons of copper ore and allowing ten charges of the cupro-ammonia solution to be decomposed the saving would be twenty-nine dollars and sixty cents, thereby making this process a commercial success.

In order that my invention may be fully understood, I will now describe the same as applied in obtaining silver and copper from ores containing the same; but it will be understood that the details of the process may be varied within the judgment of the practical operator to accommodate the process to different conditions and different ores. The practical operator will determine by preliminary tests the requisite quantity of ammonia to be used with any charge of ore, a general rule being that about four pounds of ammonia solution 26° Baumé be used for each pound of soluble precious metals contained in the charge.

In order to more readily explain my invention, I will refer to the accompanying drawings, which show the apparatus adapted for carrying on my newly-invented process.

Figure I is a fragmental view showing the apparatus partially in section. Fig. II is a vertical mid-section of the dephlegmator for heating the air, and thereby condensing the steam. Fig. III is a section of the same on line III III, Fig. II. Fig. IV is a section on line IV IV, Fig. II.

The charge of ore will be first reduced to a pulp in order that the metals may rapidly and freely dissolve. Assume that the dissolving vessel $a$ be of a capacity of one hundred cubic feet. A charge of, say, twenty cubic feet of ore and a charge of thirty cubic feet of dilute-ammonia solution will be placed together in the vessel $a$, and the vessel hermetically closed. Then air will be forced into the bottom of the vessel through a perforated pipe $b$ provided for that purpose and will rise through the mass, agitating the same, and commingling with the dilute-ammonia solution and the particles of the ore. This operation is continued for, say, a period of two hours, which will ordinarily be sufficient to dissolve the soluble precious metals contained in the ore. I contemplate providing a vessel which will stand a pressure of, say, seventy-five pounds to the square inch; but in the practical operation of the process as practiced by me I have found that the air-pressure indicated in the vessel did not exceed seven pounds to the square inch. With the ores which I have treated the quantity of air which was forced into the vessel was great enough to have produced a much higher pressure than indicated if the vessel had not contained the ore and the chemicals. After having forced in the air, as stated, and thereby continued the agitation and chemical action within the vessel for a period of about two hours the supply of air is shut off and the contents of the vessel $a$ are allowed to settle for, say, about half an hour. Then the supernatent liquid will be drawn off through a cock or cocks 1 2 3, as the case may be, and through pipe $c$ into the vessel $d$, which I term the "slimes" or "settling" tank. A number of cocks are provided at different levels to enable the operator to draw off the clear liquid from above the tailings as close down to the tailings as practicable without drawing an undue amount of the impurities into the slimes-tank $d$. After the supernatent liquid has been drawn off into the slimes-tank the cocks 1, 2, and 3 are again closed and the tailings remaining in the tank $a$ are subjected for, say, half an hour to a second treatment of dilute-ammonia solution and air, such as above described. Then the contents of tank $a$ are again allowed to settle and the supernatent liquid drawn off into the slimes-tank $d$, as before described. Then the tailings are washed out of tank $a$ through the valve-opening $a'$, provided in the bottom of said tank for that purpose. The liquor is then drawn off from tank $d$ into a separating-tank $e$, being preferably passed through a filter $f$, which is located between the slimes-tank $d$ and the separating-tank $e$ to prevent any impurities from passing into the separating-tank. The pure solution in the separating-tank is then subjected to the action of steam and hot air.

$g$ indicates a pipe for introducing the steam into the separating-tank $e$ to heat and decompose the solution and carry off the ammonia. The pipe $g$ is perforated throughout its length, so that the steam is discharged into the tank below the level of the liquid contained in the tank.

$h$ indicates a hot-air pipe, which is constructed and arranged like the steam-pipe $g$, and air under pressure is introduced through said pipe into the tank below the level of the liquid. When boiling out the cupro-ammonium solution begins, the valved pipe $i$ above the coned separating tank or boiler $e$ is opened, and the ammonia and steam from said boiler pass up through the pipe $i$ into the dephlegmator $j$ through openings $l$. They then ascend through the inner pipe $m$ by passing through openings in perforated disks $n$ and around the outsides of said disks, which do not quite meet the inside of the pipe $m$. The steam on striking the disks will be retarded and largely condensed and will run back into the boiler $e$. The ammonia and the uncondensed steam will pass out of the dephlegmator through the outlets $o$ and the pipe $p$ and be carried over to the condensing-tank $k$. During the passage of the ammonia and the steam through the dephlegmator $j$ cold air will be forced (by suitable means, not shown) into the air-chamber $q$ between the outer pipe or casing $r$ of the dephlegmator and the inner pipe $m$, entering through the opening $s$ in the lower flange, absorbing the heat from the pipe $m$, and thereby greatly aiding in the condensation of the steam. The air thus heated passes out at $t$ and is then conducted to the cone-boiler and introduced thereinto through the pipe $h$ to aid in decomposing the cuproammonium solution and rapidly expelling the ammonia, and thereby preventing the passing off of so much steam as would otherwise pass off. When the ammonia has been thus removed and oxygen supplied, the vessel $e$ will be found to contain a copper oxid and a supernatent discolored solution. The discolored solution will then be drawn off through a valve $u$, provided for that purpose. When the metals have all been removed, the ammonia solution will be returned to the tank $a$ and used over again.

As the decomposition agent of the metallic-ammonia solution is heat, the supplying of the same either as steam or hot air in succession consumes time and necessitates a very diluted metallic-ammonia solution, whereas both together decompose a concentrated metallic-ammonia solution in less time, thereby effecting a saving of both labor and fuel, expense, and time. The use of the hot air is to get more free oxygen and by its combining with the metals in solution forming metallic oxids and setting the ammonia free. Also as the oxygen combines with the metals in solution any free nitrogen combines with any free hydrogen, forming ($NH_3$) ammonia, thereby keeping up the full percentage of the ammonia in the original aqua-ammonia solution used. When decomposing the metallic-ammonia solution otherwise than by the use of both hot air and steam together, I always experienced a loss of ammonia, and this necessitated a diluted solution and the use of more steam, thereby involving loss of ammonia, more fuel, and longer time. Hence the expense account involved a failure by the old methods or a commercial success by the simultaneous use of both steam and the hot air.

The advantages of the hot air with steam are improved chemical decomposition, recovery of the full percentage of ammonia originally used, economy of fuel, and saving of time. The heat units of the hot air as obtained is a saving of that percentage of fuel needed to produce the steam or heating the metallic-ammonia solution otherwise.

The (necessary) advantage of condensing the steam out before the ammonia is condensed is, I have found by my experiments, that the storage aqua-ammonia solutions originally used (preferably a twenty-five-per-cent. solution) dissolved more copper in proportion to the same amount of ammonia in a weaker solution. I find that the best practical results are obtained by employing for every sixty-three parts of the copper contained in the ore sixty-eight parts of ammonia, thereby necessitating a concentrated solution. If the steam were not condensed and kept from passing over with the ammonia, the condensed ammonia would be in such a diluted state on account of the amount of steam passing over that its dissolving power would be too low for practical purposes, and the large volume of aqua-ammonia solution thereby created would require an enormous tankage.

What I claim, and desire to secure by Letters Patent of the United States, is—

1. In the production of metallic oxids from copper oxids by ammonia solutions, the process set forth of decomposing a cupro-ammonia solution, which consists in subjecting said solution to the simultaneous action of steam and hot air; collecting and condensing the ammonia and precipitating the metallic oxid.

2. In the production of metallic oxids from copper ores by ammonia solutions, the process set forth of decomposing a cupro-ammonia solution, which consists in subjecting said solution to the simultaneous action of steam and hot air; collecting and condensing the ammonia, and cooling the steam and thereby condensing it after the decomposing process and before the ammonia is condensed.

In testimony whereof I have signed my name to this specification, in the presence of two subscribing witnesses, at Goodsprings, Nevada, this 8th day of May, 1900.

CHARLES A. BECK.

Witnesses:
DAVID J. LEWIS,
C. M. OVER.